US005419527A

United States Patent [19]

Adams et al.

[11] Patent Number: 5,419,527

[45] Date of Patent: May 30, 1995

[54] CANDLE HOLDER

[75] Inventors: William E. Adams, Portersville, Pa.; William Raftery, Canton, Ohio

[73] Assignee: Adams Mfg. Corp., Portersville, Pa.

[21] Appl. No.: 101,738

[22] Filed: Aug. 4, 1993

[51] Int. Cl.[6] .................... F16M 13/00

[52] U.S. Cl. .................... 248/518; 248/126; 248/539; 431/289; 431/297

[58] Field of Search .................... 248/539, 126, 518; 431/289, 297, 295

[56] References Cited

U.S. PATENT DOCUMENTS

D. 313,660 1/1991 Adams .................... D26/9
832,134 10/1906 Lechner .................... 431/297
849,012 4/1907 Nehr .................... 431/289
1,128,884 2/1915 Lind .................... 431/295 X
1,750,171 3/1930 Goldstone .................... 431/395
1,831,518 11/1931 Tebo .................... 431/295 X
2,300,226 10/1942 Ketchum .................... 431/297 X
2,508,933 5/1950 Walker .................... 431/289 X

FOREIGN PATENT DOCUMENTS 22205 of 1893 United Kingdom .................... 431/297

*Primary Examiner*—J. Franklin Foss

*Attorney, Agent, or Firm*—Buchanan Ingersoll; Lynn J. Alstadt

[57] ABSTRACT

A candle holder has a base, an upright attached to one edge of the base and a candle support extending from the upright over the base. Suction cups are provided on the upright for mounting. Feet near the suction cups prevent the holder from rocking. One of a series of figures which are preferably shaped as holiday symbols is fitted into the upright. The figures preferably are removable from the upright.

31 Claims, 5 Drawing Sheets

CANDLE HOLDER

FIELD OF THE INVENTION

The invention relates to a device for holding candles against vertical surfaces such as a window.

BACKGROUND OF THE INVENTION

For many years people have observed the custom of placing a lighted candle in one or more windows of their homes. The candle could be a conventional wax candle having a slow burning wick which is ignited. More commonly, however, the candle contains a light bulb which may be powered with a battery or by use of an electrical cord. Conventionally, these candles have been placed on a window sill adjacent the window pane. However, in recent years homes, as well as other buildings, are being built with windows which have no window sill. Hence, there is a need for a holder which can be mounted on the window pane and support a candle adjacent the window pane.

When candles are placed on window sills they can easily be dislodged by pets, children or moving curtains. A lighted candle which has fallen onto a carpet or furniture may scorch or ignite the fabric. Hence, there is a need for a candle holder from which candles cannot be easily dislodged.

It has also been customary to decorate windows with various types of figures associated with a particular holiday season. Angels, bells, Santa Claus and wreath figures are common Christmas decorations. Pumpkins, ghosts and witches are used at Halloween. Turkeys and pilgrims are symbols of Thanksgiving. For Valentine's Day there is the heart and cupid. For the July 4th, the American flag, stars and firecrackers are commonly seen. Although many holiday decorations are illuminated with electric lights, none of these decorations have been incorporated into a candle holder so as to utilize the light produced from a candle placed on the holder. Similarly the art has not developed a candle holder or decoration having interchangeable figures which can be used for a variety of holiday seasons by simply changing the figure attached to the candle holder. Hence, there is no one decoration which can be used throughout the year or at least throughout the major holiday season running from Halloween to New Year's Day.

SUMMARY OF THE INVENTION

We provide a candle holder having a base and upright extending from the base and a candle support extending from the upright over the base. In one embodiment the upright has at least one slot or aperture on which a suction cup can be mounted for attaching the holder to a window pane or other vertical surface. A guide edge is provided on the perimeter of the upright. The guide edge has a cross section which will enable a slotted figure to be fitted over the upright and there be retained against transverse movement. Preferably the upright and the figure are translucent so that an illuminated candle placed on the holder will illuminate, and preferably accentuate, a figure placed on the upright. The figure can be removed by simply lifting it vertically from the upright. We prefer to provide a variety of figures each having a shape which is associated with a holiday. Thus, the candle holder can remain in place through many seasons with the figure being changed as the holidays change.

A second preferred embodiment is similar to the first except that suction cups are attached to the removable figure. In this embodiment means are provided to lock the figure in place on the upright.

In a third preferred embodiment present embodiment the upright is shaped as a seasonal or other figure.

We prefer to provide at least two legs extending from the upright away from the base. These legs provide important support and stability to prevent the holder from rocking about the suction cup which mounts it to the vertical surface.

We further prefer to provide a retainer on an edge of the base opposite the upright to prevent a candle placed on the base from sliding off of the base. In one embodiment we provide interlocking arms or a wire tie to hold the candle on the base. We also may provide a pad on the base onto which the candle can be placed. Other objects and advantages of the invention will be apparent as a description of certain present preferred embodiments shown in the figures proceeds.

DESCRIPTION OF THE PREFERRED EMBODIMENTS

Figure 1:
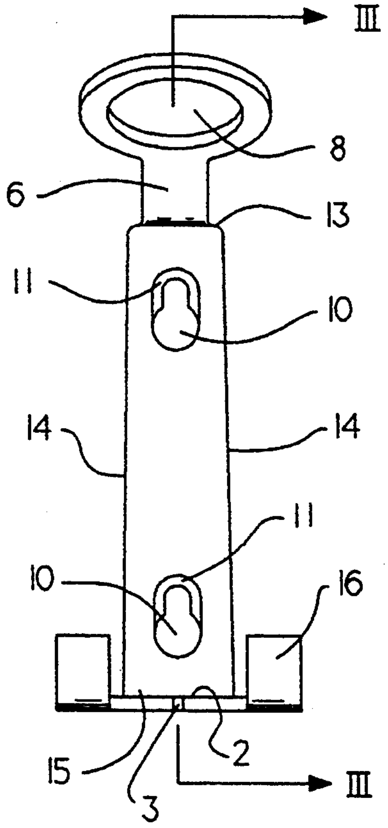
FIG. 1 is a front view of a first present preferred embodiment our candle holder.
Figure 3:
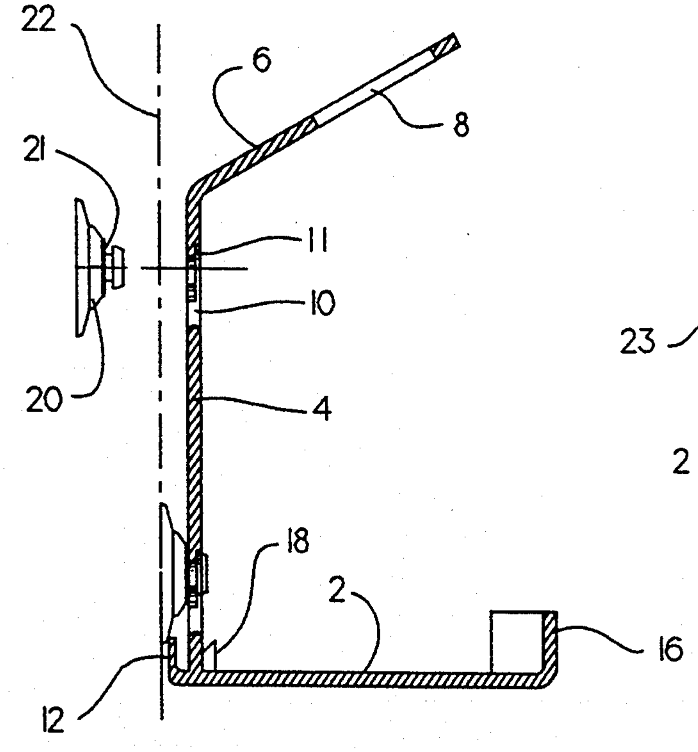
FIG. 3 is a sectional view taken along the line III—III of FIG. 1.
Figure 4:
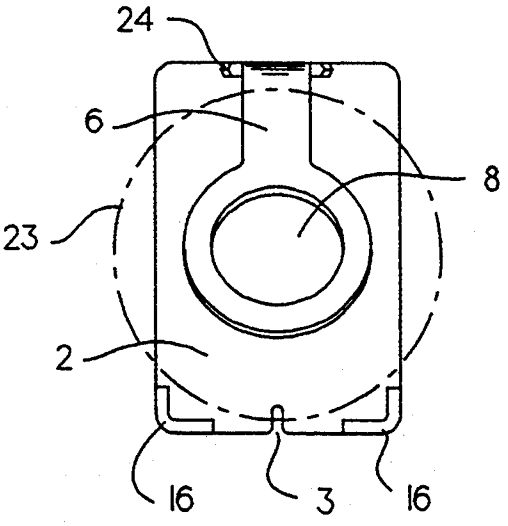
FIG. 4 is a top plan view of a second preferred embodiment of our candle holder.

As shown in FIGS. 1 and 3, a first preferred embodiment of our candle holder is comprised generally of a base 2 having an upright 4 extending from the base. A candle support 6 extends from the upright over the base. The base, upright and candle support may be molded separately and welded, glued or snap fit together. Alternatively, they could be molded together as in the embodiment of FIG. 17. The candle support 6 has an aperture 8 through which a candle can fit. Although the aperture in the drawings is circular, it could be oval or any other configuration. Apertures 10, preferably having a beveled edge 11, are provided in the upright. Each aperture is sized to receive a neck 21 of suction cup 20 which is fitted into the aperture 10. The suction cups are used to mount the candle holder on a vertical surface such as a window pane indicated by chainline 22 in FIG. 3. They could also be attached to the upright by screws or other fasteners. We prefer to provide two feet 12 at either corner of base. However, a single foot extending across the base is also suitable. One could also place the feet at other locations along the upright. When the candle holder is pressed against the window pane 22, feet 12 will abut the window pane. These feet are sized and positioned to prevent the candle holder from being rocked against the window pane. This stability makes the suction cup hold longer. Without this stability, movement encourages a "pumping" action working air underneath the cup which will ultimately cause the cup to release. The legs also serve as a guide for assuring that proper compression of the suction cup is obtained when the candle holder is mounted on a window pane. We prefer to provide a retainer 16 at either corner of the base 2 to prevent a candle placed on the base from sliding off. We also prefer to provide a cord slot 3 in the base. An electric candle placed on the base 2 as indicated by chainline 23 in FIG. 4 can be positioned so that the cord extending from the candle fits securely in slot 3. A guide edge 14 on the upright 4 will engage a removable figure such as is shown in FIGS. 6, 7, 12 and 13. The guide edge is preferably tapered from a minor width at the top 13 of the upright to a wider width 15 at the bottom 15 of the upright. As shown in the embodiment of FIG. 4 we prefer that the guide edge 14 have a locking surface. This locking surface could be a double beveled edge 24 shown in FIG. 4. One could also use a tongue and groove arrangement or other shape which enables the guide edge to meet and lock with a mating edge provided in a figure placed over the upright.

In FIGS. 5 thru 8 we show yet another embodiment of our candle holder generally identified as 30. In this embodiment we provide a base 32 and upright 34 which has a beveled edge 35. As in the previous embodiment an aperture 4 is provided in the upright for receipt of the neck of a suction cup. A candle support 36 extends from the top of the upright 34. As in the previous embodiment we prefer to provide a retainer 37 at the outer edge of the base. We also prefer to provide a pad on the base onto which a candle will be placed. This pad could be a resilient material such as polyurethane or an adhesive layer or tape which creates greater adhesion or friction between a candle placed on the base and the base thereby lessening the chance that a candle will be dislodged from the holder. An angel FIG. 40 has a slot 44 which is sized to accommodate the upright 34 of the candle holder 30. The slot in angel 44 has a beveled mating surface 45 which engages beveled edge 35 of upright 34. The angel is preferably made of a transparent or translucent material so that light emitted from the candle placed on the candle holder will pass through the angel and illuminate it.

We prefer to mold the figure to have relatively thin bodies with ribs on the side which faces the candle. The ribs may serve a dual function. First, they provide reinforcement. Hence, any stress on the figure which occurs as it is being placed on the holder will spread throughout the figure. Also, stress from the holder is spread to resist cracking and crazing at stress points which is common to thin plastic articles exposed to the sun. The ribs also prevent warping and do not cause unsightly shrinking in the finished part. A second function of the ribs is to act as light pumps. The ribs can be sized and positioned relative to the candle to gather and focus light on desired areas. For example, we prefer to provide ribs 41 on the angel shown in FIG. 7. These ribs outline the figure making it easily recognizable from the street. If desired the FIG. 40 may be angled or contoured to partially encircle the candle to get more light on the figure and the ribs.

Figure 6:
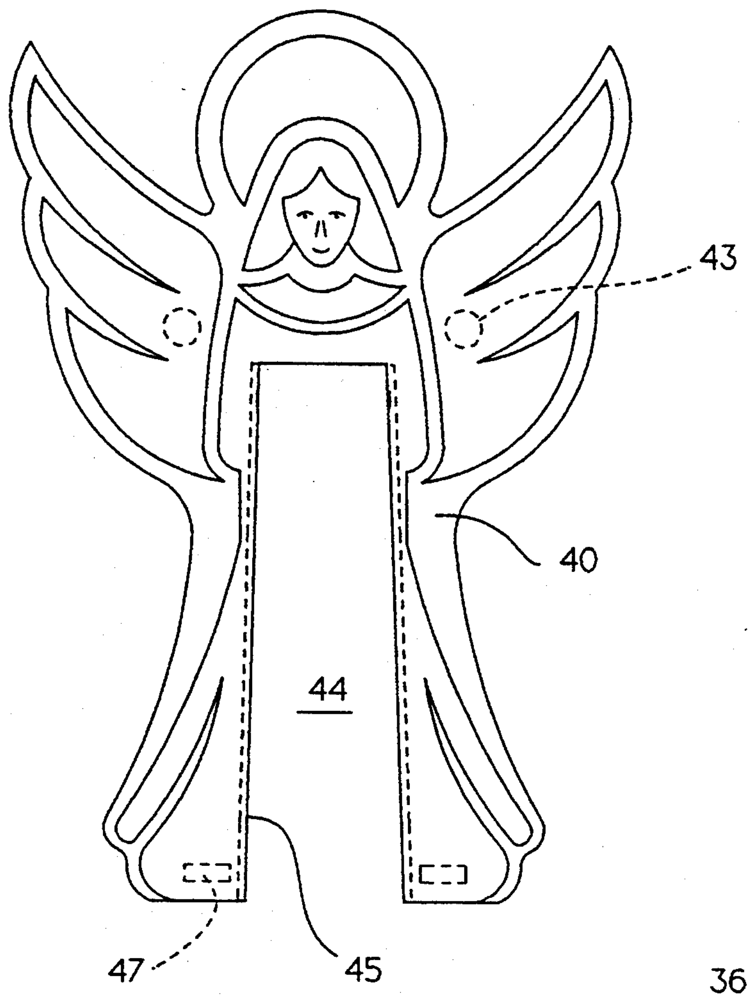
FIG. 6 is a front view of an angel figure sized to be placed on the candle holder of FIG. 5.
Figure 5:
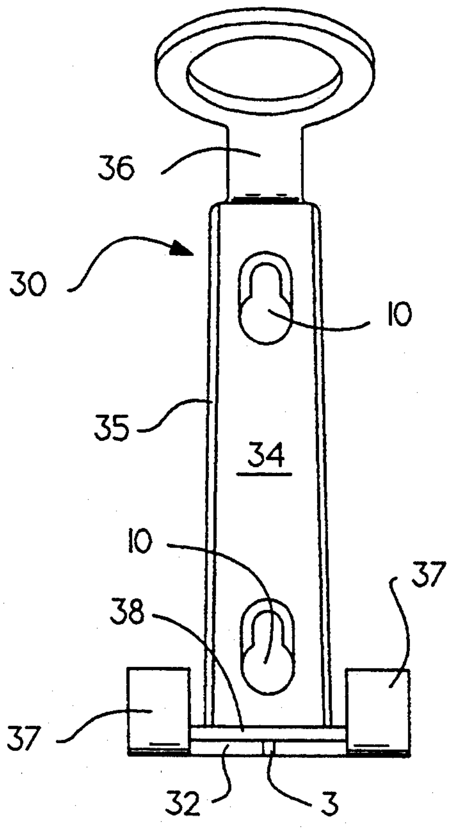
FIG. 5 is a front view of a third present preferred embodiment of our candle holder.
Figure 11:
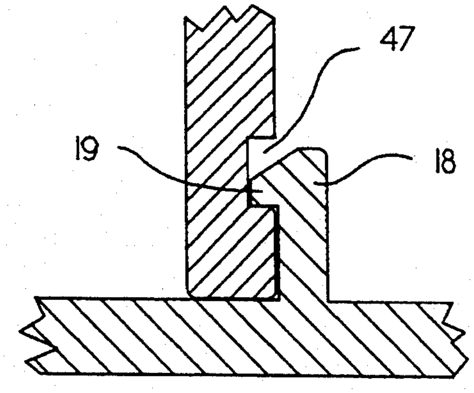
FIG. 11 is a detail showing the interlocking feature of the embodiment of FIG. 10.
Figure 7:
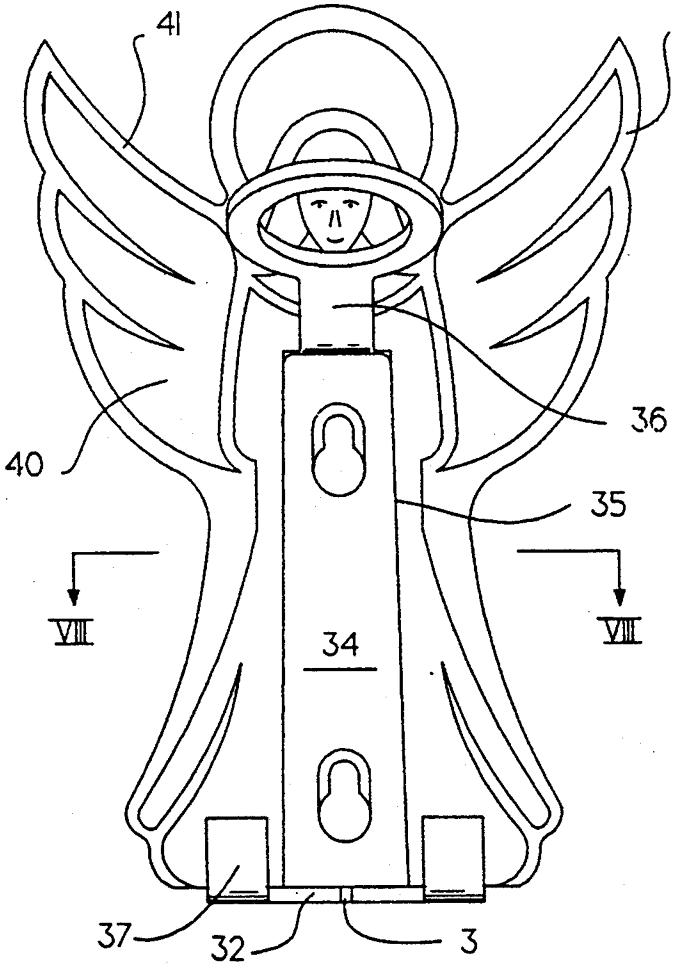
FIG. 7 is a front view of the candle holder of FIG. 5 with the angel of FIG. 6 mounted thereon.
Figure 9:
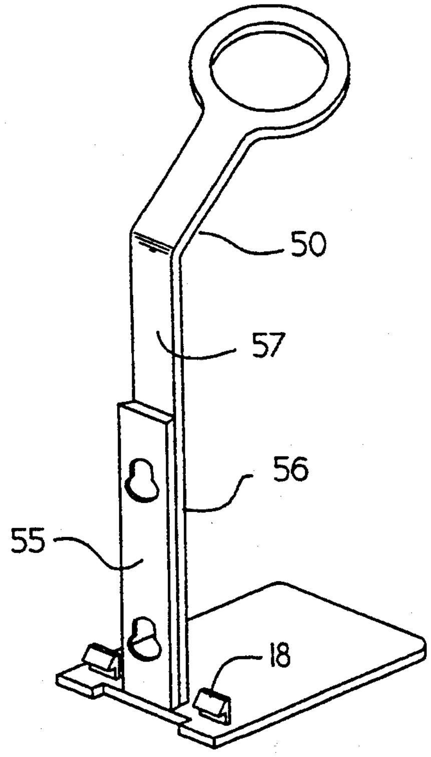
FIG. 9 is a front view of a third preferred embodiment of our candle holder.
Figure 8:
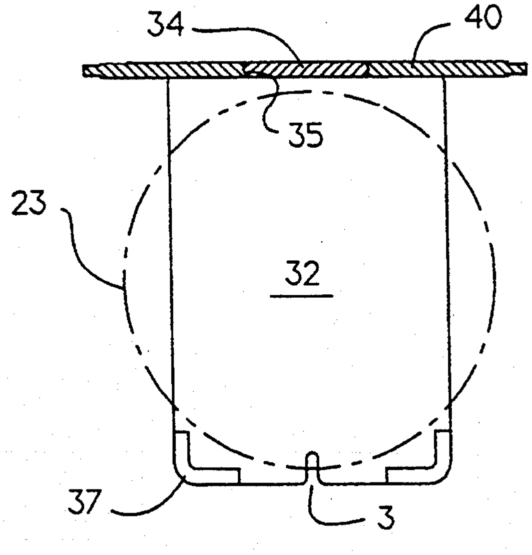
FIG. 8 is a sectional view taken along the line VIII—VIII of FIG. 7.

The angel figure of FIGS. 6 and 7 can optionally be provided with recesses 47 and tabs 48 having projections 49 can be provided on the base. As shown in FIG. 11 the projections 49 will mate with recesses 47 to lock the angel in place. In the embodiment of FIG. 9 we have locking tabs 18 positioned on the base near upright 56 which has a lower portion 55 and upper portion 57.

One could also attach suction cups to the figure as indicated by the dotted circles 43 in FIG. 6. These suction cups can be used in place of or in addition to the suction cups connected to the upright 34 at apertures 4.

Figure 10:
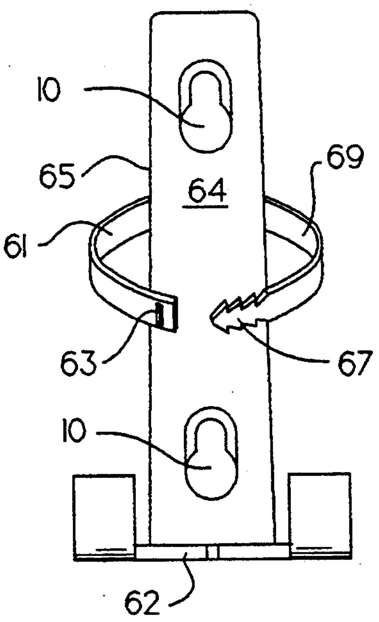
FIG. 10 is a perspective view of a fourth present preferred embodiment of our candle holder.

Yet another embodiment of our candle holder 60 is shown in FIG. 10. There we provide a base 62 having an upright 64 extending therefrom. Apertures 4 are provided in the upright. The upright has a mating surface 65 which engages a mating edge such as edge 45 of the angel 40 shown in FIG. 6. In this embodiment the candle support is comprised to two arms 61 and 69. The distal ends of these arms are configured so that the arms can be interlocked. In this particular embodiment a slot 63 is provided in arm 61. A series of projections 67 is provided at the distal end of arm 62. Hence, the end of arm 69 can be threaded through the slot 63 in arm 61 and the projections 67 will cause the arms to remain interlocked. One could use other fasteners to connect the ends of arms 61 and 69.

Figure 12:
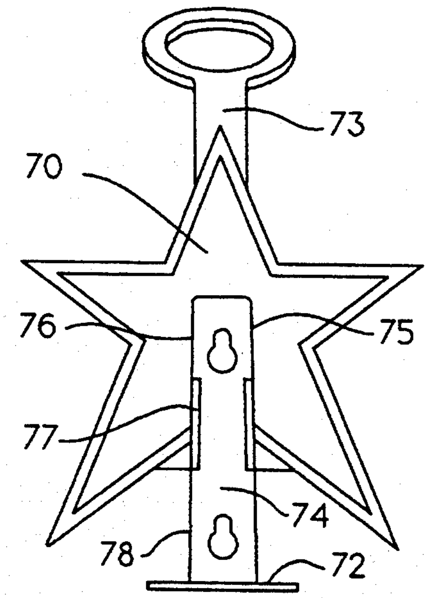
FIG. 12 is a rear view of a fourth present preferred embodiment of our candle holder with a star figure.

In FIG. 12 we show yet another embodiment of our candle holder. Here a star FIG. 70 is fitted over upright 74 which extends from base 72. It should be noted that the star does not extend to the base 72 when in its mounted position. Furthermore, in this embodiment we provide a guiding edge 75 which has portions 76, 77 and 78 that a alternately beveled toward and away from the candle holder 73 which extends over the base. This configuration will receive a beveled edge provided on the slot in the star FIG. 70.

Figure 13:
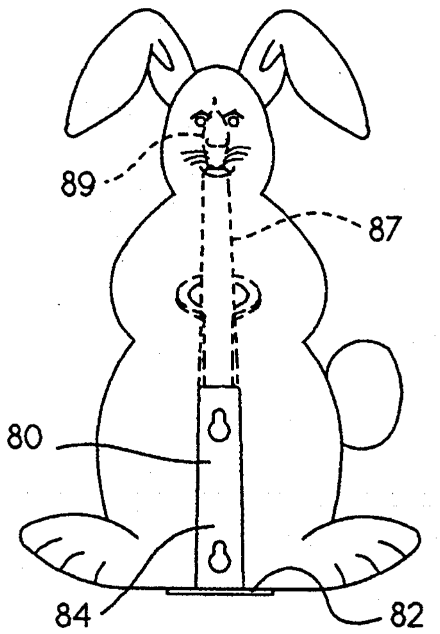
FIG. 13 is a fifth present preferred embodiment of candle holder with an Easter bunny figure.

A candle holder 80 having an Easter bunny figure mounted thereon is shown in FIG. 13. As shown in the previous embodiments the Easter bunny figure has a slot into which candle upright 84 is fitted. In this embodiment, however, the figure is sized so than a candle indicated by chainline 87 which is placed on base 82 will not extend above the figure. Preferably, the illuminated portion 89 of the candle will be behind the bunny's face.

Figure 2:
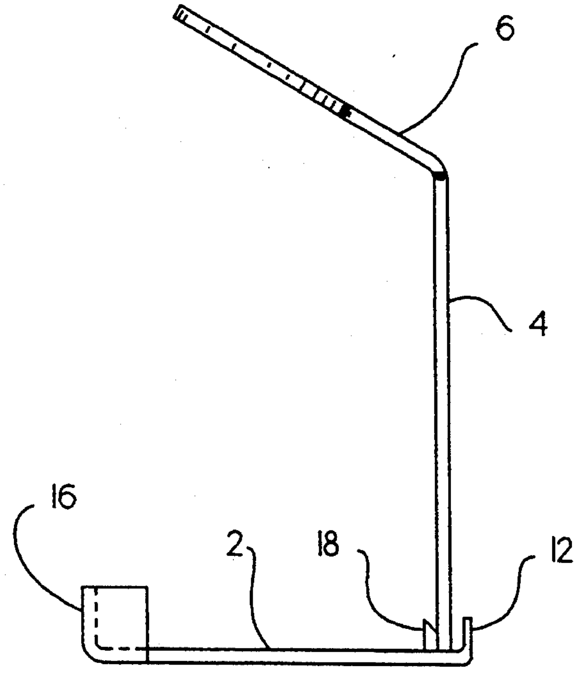
FIG. 2 is a side view of the embodiment of FIG. 1
Figure 14:
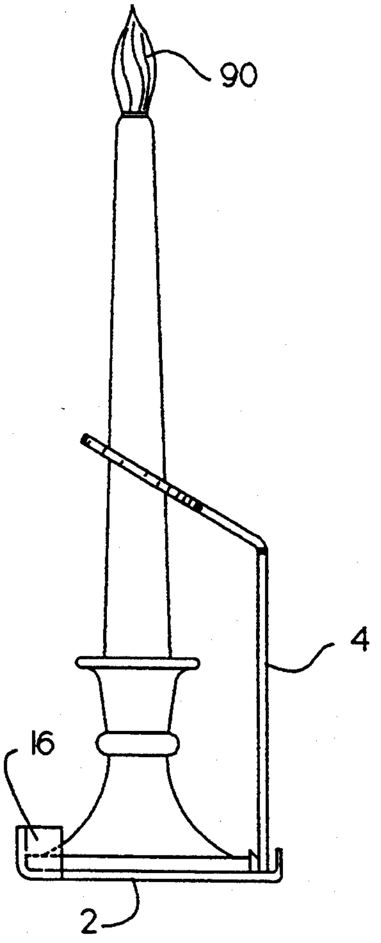
FIG. 14 is a side view of the embodiment of FIG. 1 with a candle placed therein.
Figure 15:
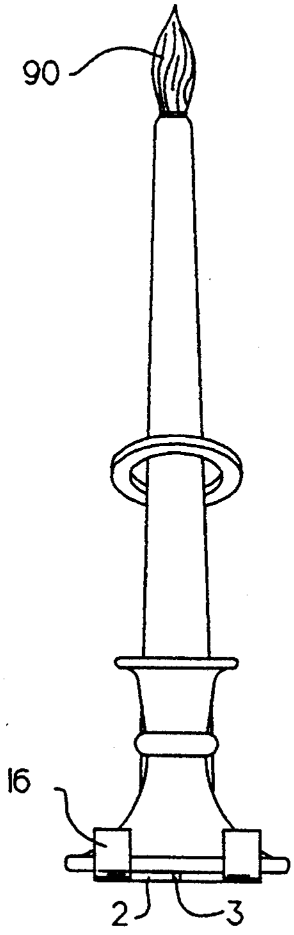
FIG. 15 is a front view of the embodiment of FIG. 14
Figure 16:
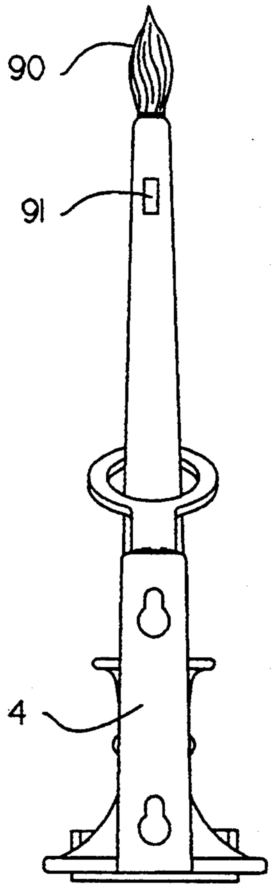
FIG. 16 is a rear view of the embodiment of FIGS. 14 and 15.

In FIGS. 14 thru 16 we illustrate generally how a candle can be placed in our candle holder using the embodiment shown in FIGS. 1 thru 3. Conventionally, the base of such candles is three inches in diameter. Therefore, we prefer that our base extend at least three inches from the upright portion 4 to the retainer 16. The candle preferably is an electric or battery powered candle having a light bulb 90. The candle may have a light sensitive switch 91 which activates the candle.

While we illustrated a single candle on our candle holder, the device can hold sets having 3, 5 or 7 candles on a single base. Some plant arrangements having a candle or upright which can be held by the candle support may also be placed on our candle holder.

Figure 18:
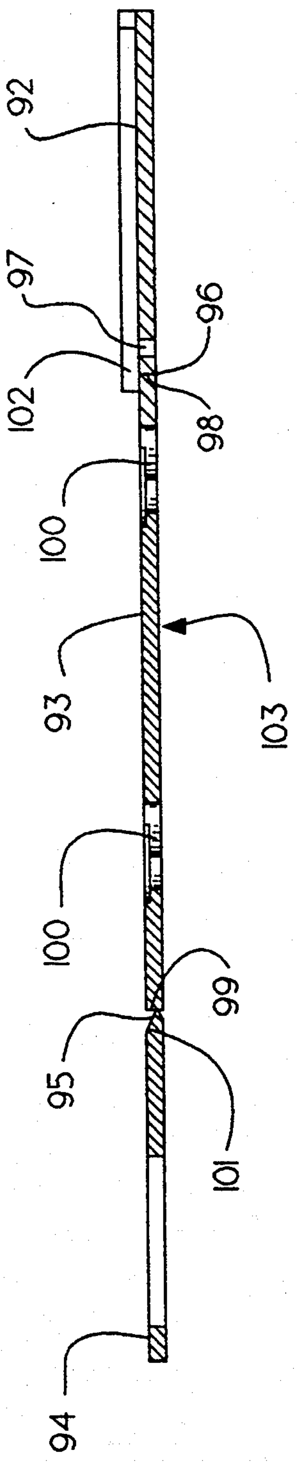
FIG. 18 is a sectional view taken along the line XVIII—XVIII of FIG. 17.
Figure 17:
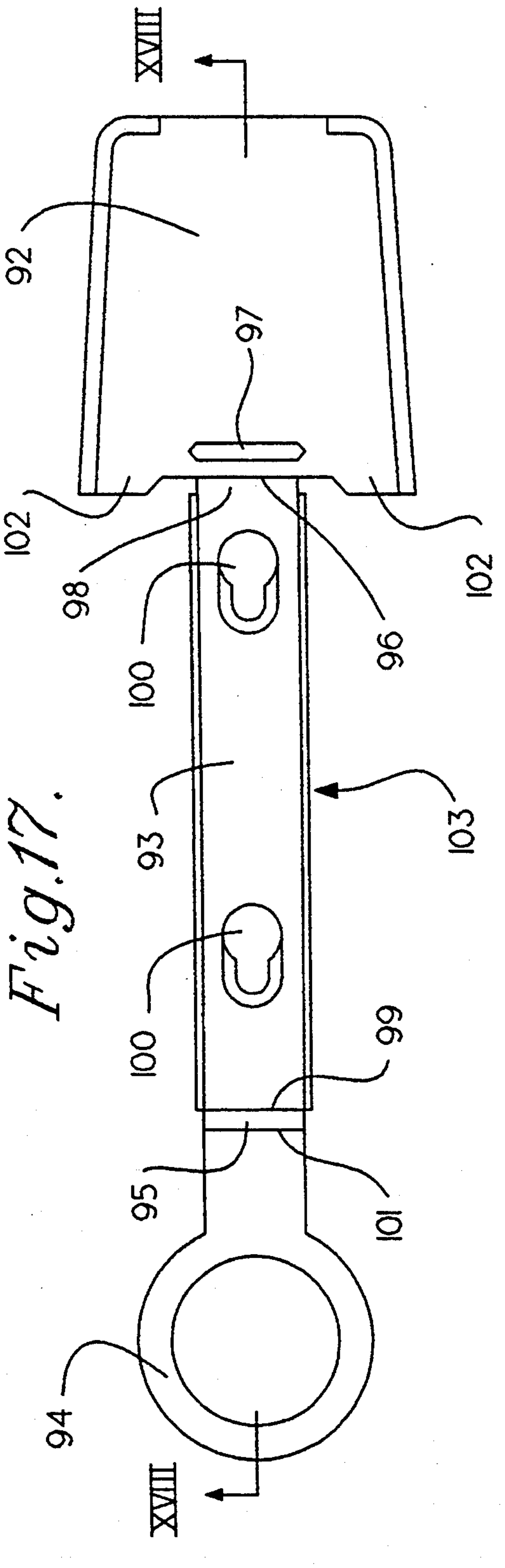
FIG. 17 is a top view of the sixth present preferred embodiment of our candle holder.

In FIGS. 17 and 18 we show yet another embodiment of our candle holder 103. In this embodiment we provide base 92, upright 93 and candle support 94, which are formed as a unitary structure. We also provide a folding notch 95 interposed between upright 93 and candle support 94. The notch 95 is formed by the beveled surfaces of candle support bottom edge 101 and upright top edge 99. When candle support 94 is folded along notch 95, edge 99 and edge 101 abut so that a candle can be aligned substantially parallel with upright 93. We also provide on upright 93 apertures 100 into which suction cups may be fitted.

In addition, one could provide for removable attachment of support 94 to holder 103, so that support 94 later can be reattached to holder 103 and aligned with upright 93 by the user. One could also provide for support 94 to be pivotably attached to holder 103, allowing the user to later align support 94 with upright 93.

We prefer to provide in this embodiment a separation score line 96 to facilitate separation of base 92 from candle holder 103. In this particular embodiment, a slot 97 is provided in base 92 so that after base 92 is separated from upright 93, edge 98 of upright 93 can be inserted into slot 97. One could provide a snap fit or glue this joint. One could also use a tongue and groove arrangement, a hinge arrangement or other shapes at separation score line 96 which enable upright 93 to engage and lock with base 92. Because this embodiment can be packed in a flat condition and assembled by the user, units can be packaged and displayed in any given container or display.

We also prefer to provide support feet 102 extending across base 92. Feet 102 inhibit horizontal and vertical rocking movements thus providing a stabilizing effect similar to that afforded by feet 12 illustrated in FIGS. 2 and 3.

Our candle holder can be made of a variety of materials. We prefer to make the candle holder of polycarbonate, polyvinyl chloride or styrene. Certain light illuminating plastics may be used for the upright and the figures. We further prefer that the candle holder be injection molded as a single piece as indicated by the embodiment of FIGS. 17 and 18. However, as indicated by the embodiment of FIG. 9, the upright and base could be molded as one part whereas the candle holder could be a separate part which is glued, welded or friction fitted to the upright.

Even though we have shown the removable figures as holiday symbols, they may be otherwise shaped and may contain words or other indicia. For example one may provide a set of rectangular signs having price or other information. The signs could be used to advertise sales or other specials.

Even though we have shown a figure removably engaged with the guide edge on the upright, such as shown in FIGS. 6, 7, 12 and 13, such a figure instead could be permanently affixed to the upright. Alternatively, one could mold the upright in the form of a seasonal figure or other desired shape.

Although we have illustrated and described present preferred embodiments of our candle holder it should be distinctly understood that our invention is not limited thereto, but may be variously embodied within the scope of the following claims.

We claim:

1. A candle holder comprising:

a base;

an upright attached to the base and having a guide edge adapted to receive a figure which has a mating slot sized to fit over the upright and be restrained from transverse movement by the guide edge, the upright shaped to permit attachment of at least one suction cup to the upright;

a candle support extending from the upright over the base and sized to engage a candle placed on the base and prevent the candle from falling from the base when the candle is subjected to forces acting on the candle in a direction parallel to the base; and at least two feet attached to the upright and extending in a direction opposite the base.

2. The holder of claim 1 wherein the candle holder is comprised of a plastic selected from the group consisting of polypropylene, polycarbonate, polyvinyl chloride and styrene.

3. The holder of claim 1 also comprising a plurality of suction cups removably attached to the upright.

4. The holder of claim 1 also comprising a retainer extending from at least one edge of the base and being sized and positioned to inhibit a candle placed on the base from sliding off the base.

5. The holder of claim 4 wherein the retainer is comprised of at least two segments.

6. The holder of claim 1 also comprising a pad on a surface of the base the pad being sized and positioned for placement of a candle thereon.

7. The holder of claim 1 wherein light may pass through the upright.

8. The holder of claim 7 wherein the upright is translucent.

9. The holder of claim 1 wherein the candle support is comprised of a pair of interlocking arms.

10. The holder of claim 9 also comprising at least one fastener attached to a distal end of at least one arm.

11. The candle holder of claim 1 wherein the guide edge is beveled.

12. The candle holder of claim 1 also comprising a figure having a slot sized to engage the upright which figure is removably attached to the upright.

13. The holder of claim 12 wherein the figure has a shape customarily associated with a holiday.

14. The holder of claim 13 wherein the shape is selected from the group consisting of angels, bunnies and stars.

15. The holder of claim 12 wherein the figure is sized so that a candle placed on the base will not extend above the figure.

16. The holder of claim 12 also comprising at least one locking tab attached to the base the locking tab being sized and positioned to engage the figure.

17. The holder of claim 12 wherein the figure is sized and configured so as not to extend to the base.

18. The candle holder of claim 1 also comprising a figure which is permanently affixed to the upright.

19. A candle holder comprising:

a base;

an upright attached to the base and having a guide edge adapted to receive a figure which has a mating slot sized to fit over the upright and be restrained from transverse movement by the guide edge, the upright shaped to permit attachment of at least one suction cup to the upright;

a candle support extending from the upright over the base and sized to engage a candle placed on the base and prevent the candle from falling from the base when the candle is subjected to forces acting on the candle in a direction parallel to the base; and a figure removably fitted on the upright the figure having a mating slot which engages the guide edge of the upright.

20. The holder of claim 19 wherein the figure has a shape customarily associated with a holiday.

21. The holder of claim 19 also comprising a plurality of suction cups removably attached to the upright.

22. The holder of claim 19 also comprising a retainer extending from at least one edge of the base and being sized and positioned to inhibit a candle placed on the base from sliding off the base.

23. The holder of claim 19 wherein the figure is sized so that a candle placed on the base will not extend above the figure.

24. The holder of claim 19 also comprising at least one locking tab attached to the base the locking tab being sized and positioned to engage the figure.

25. The holder of claim 19 wherein the figure is sized and configured so as not to extend to the base.

26. A candle holder comprising:

a base having a top edge and a slot, the slot sized to receive an upright and the slot being located a selected distance from the top edge;

an upright having a bottom edge, a top edge and at least one guide edge, the bottom edge sized to fit within the slot in the base, and the guide edge adapted to receive a figure which has a mating slot sized to fit over the upright and be restrained from transverse movement by the guide edge, the upright shaped to permit attachment of at least one suction cup to the upright, and the top edge of the base being releasably attached to the bottom edge of the upright; and a candle support, having a bottom edge, extending from the upright over the base, the candle support sized to engage a candle placed on the base and prevent the candle from falling from the base when the candle is subjected to forces acting on the candle in a direction parallel to the base, the bottom edge of the candle support being movably attached to the top edge of the upright.

27. The holder of claim 26 wherein the candle support is pivotably attached to the upright.

28. The holder of claim 26 wherein the candle support is removably attached to the upright.

29. The holder of claim 26 wherein the candle holder is comprised of a plastic selected from the group consisting of polycarbonate, polyvinyl chloride and styrene.

30. The holder of claim 26 wherein base, upright and candle support lie in a single plane.

31. The holder of claim 26 also comprising a plurality of suction cups attached to the upright.

* * * * *